United States Patent
Daruwalla

(10) Patent No.: US 7,174,376 B1
(45) Date of Patent: Feb. 6, 2007

(54) IP SUBNET SHARING TECHNIQUE IMPLEMENTED WITHOUT USING BRIDGING OR ROUTING PROTOCOLS

(75) Inventor: Feisal Y. Daruwalla, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 841 days.

(21) Appl. No.: 10/187,035

(22) Filed: Jun. 28, 2002

(51) Int. Cl.
   *G06F 15/173* (2006.01)
(52) U.S. Cl. .................. 709/223; 709/223; 709/225; 709/238; 709/245; 370/350; 370/351; 370/401; 370/409
(58) Field of Classification Search ........ 709/223–225, 709/227, 245, 249, 250, 238–242; 370/350–351, 370/401, 409
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,572,528 A | 11/1996 | Shuen | |
| 5,619,552 A | 4/1997 | Karppanen et al. | |
| 5,729,537 A | 3/1998 | Billstrom | |
| 5,751,971 A * | 5/1998 | Dobbins et al. ............ 709/238 |
| 5,793,763 A | 8/1998 | Mayes et al. | |
| 5,825,759 A | 10/1998 | Liu | |
| 5,825,772 A * | 10/1998 | Dobbins et al. ............ 370/396 |
| 5,835,696 A | 11/1998 | Hess | |
| 5,862,345 A | 1/1999 | Okanoue et al. | |
| 5,862,451 A | 1/1999 | Grau et al. | |
| 5,943,604 A | 8/1999 | Chen et al. | |
| 5,949,753 A | 9/1999 | Alexander, Jr. et al. | |
| 5,963,540 A | 10/1999 | Bhaskaran | |
| 5,963,557 A | 10/1999 | Eng | |
| 5,982,745 A | 11/1999 | Wolff et al. | |
| 5,999,536 A | 12/1999 | Kawafuji et al. | |
| 6,023,769 A | 2/2000 | Gonzalez | |
| 6,065,061 A | 5/2000 | Blahut et al. | |
| 6,078,595 A | 6/2000 | Jones et al. | |
| 6,091,732 A * | 7/2000 | Alexander et al. .......... 370/401 |
| 6,148,410 A | 11/2000 | Baskey et al. | |
| 6,157,965 A | 12/2000 | Mohammed et al. | |
| 6,189,102 B1 | 2/2001 | Beser | |
| 6,195,705 B1 | 2/2001 | Leung | |

(Continued)

OTHER PUBLICATIONS

Daruwalla et al., "Method for a Cable Modem to Rapidly Switch to a Backup CMTS", Assignee: Cisco Technologies, Inc., pp. 1-53.

(Continued)

*Primary Examiner*—Saleh Najjar
*Assistant Examiner*—Shawki Ismail
(74) *Attorney, Agent, or Firm*—Beyer Weaver & Thomas, LLP; Dean E. Wolf

(57) ABSTRACT

An IP subnet sharing technique is described which allows multiple network devices of an access network to share an IP subnet without the need for each network device to run complex routing protocols, or bridging protocols. Further, the multiple network devices are able to share an IP subnet without the need to subdivide the IP subnet into smaller groups.

17 Claims, 10 Drawing Sheets

U.S. PATENT DOCUMENTS

| | | |
|---|---|---|
| 6,202,169 B1 | 3/2001 | Razzaghe-Ashrafi et al. |
| 6,230,326 B1 | 5/2001 | Unger et al. |
| 6,236,678 B1 | 5/2001 | Horton et al. |
| 6,249,820 B1 * | 6/2001 | Dobbins et al. ............ 709/238 |
| 6,282,201 B1 * | 8/2001 | Alexander et al. .......... 370/401 |
| 6,298,063 B1 | 10/2001 | Coile et al. |
| 6,389,027 B1 | 5/2002 | Lee et al. |
| 6,397,260 B1 | 5/2002 | Wils et al. |
| 6,438,123 B1 | 8/2002 | Chapman |
| 6,449,249 B1 | 9/2002 | Cloonan et al. |
| 6,449,250 B1 | 9/2002 | Otani et al. |
| 6,466,986 B1 * | 10/2002 | Sawyer et al. .............. 709/245 |
| 6,477,197 B1 | 11/2002 | Unger |
| 6,487,605 B1 | 11/2002 | Leung |
| 6,490,727 B1 | 12/2002 | Nazarathy et al. |
| 6,510,162 B1 | 1/2003 | Fijolek et al. |
| 6,553,568 B1 | 4/2003 | Fijolek et al. |
| 6,556,591 B2 | 4/2003 | Bernath et al. |
| 6,577,642 B1 | 6/2003 | Fijolek et al. |
| 6,611,868 B1 | 8/2003 | Arutyunov |
| 6,650,624 B1 | 11/2003 | Quigley et al. |
| 6,650,641 B1 | 11/2003 | Albert et al. |
| 6,698,022 B1 | 2/2004 | Wu |
| 6,711,171 B1 * | 3/2004 | Dobbins et al. ............ 370/400 |
| 6,751,191 B1 | 6/2004 | Kanekar et al. |
| 6,760,316 B1 | 7/2004 | Hebsgaard et al. |
| 6,763,032 B1 | 7/2004 | Rabenko et al. |
| 6,839,829 B1 * | 1/2005 | Daruwalla et al. ............ 712/28 |
| 6,965,584 B2 * | 11/2005 | Agrawal et al. ............ 370/331 |
| 7,039,049 B1 * | 5/2006 | Akgun et al. ............... 370/389 |
| 7,047,313 B1 * | 5/2006 | Broerman ................... 709/238 |
| 7,058,007 B1 * | 6/2006 | Daruwalla et al. .......... 370/216 |
| 2002/0023174 A1 * | 2/2002 | Garrett et al. ............. 709/245 |
| 2002/0136203 A1 * | 9/2002 | Liva et al. .................. 370/352 |
| 2003/0198215 A1 * | 10/2003 | Merrill et al. .............. 370/351 |
| 2004/0045035 A1 * | 3/2004 | Cummings et al. ......... 725/114 |

OTHER PUBLICATIONS

Daruwalla et al., "Routing Protocol Based Redundancy Design for Shared-Access Networks", Assignee: Cisco Technologies, Inc., pp. 1-69.

* cited by examiner

IP SUBNET SHARING TECHNIQUE IMPLEMENTED WITHOUT USING BRIDGING OR ROUTING PROTOCOLS

CROSS REFERENCE TO RELATED APPLICATIONS

The present application is related to U.S. patent application Ser. No. 09/484,189, filed 18 Jan. 2000, by Feisal Daruwalla, et al. That application is incorporated herein by reference in its entirety for all purposes.

The present application is also related to U.S. patent application Ser. No. 09/484,611, filed 18 Jan. 2000, by Feisal Daruwalla, et al. That application is incorporated herein by reference in its entirety for all purposes.

The present application is also related to U.S. patent application Ser. No. 09/894,958, filed Jun. 27, 2001, by Feisal Daruwalla, et al. That application is incorporated herein by reference in its entirety for all purposes.

The present application is also related to U.S. patent application Ser. No. 09/894,864, filed Jun. 27, 2001, by Feisal Daruwalla, et al. That application is incorporated herein by reference in its entirety for all purposes.

BACKGROUND OF THE INVENTION

The present invention relates generally to communications over a shared-access data network, and more specifically to a technique for implementing IP subnet sharing among multiple network devices without using bridging or routing protocols.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

FIG. 1 shows a block diagram of a conventional two-way hybrid fiber-coaxial (HFC) cable network 100. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc. Additionally, as shown in FIG. 1, the Head End complex 102 typically includes a Cable Modem Termination System (CMTS). Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet. The cable modems typically reside at the subscriber premises 110A–D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, Radio Frequency Interface Specification (document control number SP-RFIv2.0-101-011231, Dec. 31, 2001). That document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems 112a residing at subscriber premises 110a–d. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

FIG. 2 provides an example of a conventional DOCSIS enabled CMTS. In the embodiment shown in FIG. 2, the CMTS 204 provides functions on several layers including a physical layer 232, and a Media Access Control (MAC) layer 230. Generally, the physical layer is responsible for receiving and transmitting RF signals on the cable plant. Hardware portions of the physical layer include a downstream modulator and transmitter 206 and an upstream demodulator and receiver 214. The physical layer also includes software for driving the hardware components of the physical layer.

Upstream optical data signals (packets) arriving via an optical fiber node are converted to electrical signals by a receiver, and the upstream information packet is then demodulated by the demodulator/receiver 214 and passed to MAC layer block 230.

A primary purpose of MAC layer 230 is to encapsulate, with MAC headers, downstream packets and decapsulate, of MAC headers, upstream packets. The encapsulation and decapsulation proceed as dictated by the above-mentioned DOCSIS standard for transmission of data or other information. MAC layer block 230 includes a MAC controller 234 which is configured to provide the DOCSIS compliant functionality.

After MAC layer block 230 has processed the upstream information, it is then switched to an appropriate data network interface on data network interface 202. When a packet is received at the data network interface 202 from an external source, the packet is passed to MAC layer 230. The MAC controller 234 then transmits information via a one-way communication medium to downstream modulator and transmitter 206. Downstream modulator and transmitter 206 takes the data (or other information) in a packet structure and converts it to modulated downstream frames, which are then transmitted to downstream cable modems.

One of the problems associated with many conventional access networks relates to the scarcity of IP address space in such networks. Currently, service providers may use a variety of different techniques for sharing an IP subnet across multiple network devices in an access network. One such technique involves the subdividing of an IP subnet into multiple, smaller subnets. Each of the smaller subnets are then assigned to different network devices in the network. The network devices use standardized routing protocols to exchange the subnet information (within the network) with each other and with an aggregation router. The aggregation router reconstructs the original IP subnet for proper packet forwarding and routing with external networks.

One problem associated with the subdividing of IP subnets is that the IP subnet divisions are typically statically provisioned and assigned to specific network devices, and are not dynamically re-configurable. For example, using conventional techniques, it is possible to subdivide an IP subnet into multiple, smaller IP subnet groups wherein each IP subnet group is capable of providing, for example, 8 unique IP addresses. Assuming that each of the subnet groups were provisioned and assigned to a different DCMTS (in the cable network of FIG. 3), each of the DCMTS devices would be able to provide service for up to 8 different customers. However, if it were then desired for at least one of the DCMTS devices to provide service to more than 8 customers, the entire IP subnet subdivision must then be re-allocated using a new, statically allocated subnet subdivision scheme, and then provisioned out to each of the affected DCMTS devices in the cable network.

Another technique which is conventionally used for sharing an IP subnet across multiple network devices is referred to as route injection. Using the route injection technique, network devices, (such as, for example, DCMTS devices) may dynamically assign IP addresses to requesting customers on an individual basis, and inject the newly assigned host route into the access network using an aggregation gateway router. The aggregation router reconstructs the original subnet for proper packet forwarding and routing with external networks. However, in order to implement IP subnet sharing using the route injection technique, each network device must be configured to support and run a full suite of standardized routing protocols in order, for example, to exchange the injected host routes with other network elements and/or the aggregation router. Such a solution is therefore undesirable since it will result in a relative increase in cost and complexity of each network device.

Another technique which may be used for sharing an IP subnet across multiple network devices is through the use of a bridging technique, wherein the network devices are configured to handle traffic using layer 2 addresses (and not layer 3 addresses). Additionally, an aggregation router may be used to manage the IP subnet and communicate the IP subnet information with external networks. However, the bridging technique also presents a number of problems including excessive flooding issues, and more importantly, security issues.

Accordingly, it will be appreciated that there exists a continual desire to efficiently utilize addressing space in an access network in a manner which avoids at least some of the problems associated with conventional IP subnet sharing techniques.

SUMMARY OF THE INVENTION

According to different embodiments of the present invention, various methods, devices, and computer program products are described for sharing a subnet of IP addresses among a plurality of network devices in an access network. In specific embodiments, the access network includes a head end complex, a plurality of nodes, and a plurality of intermediate network devices. Each of the plurality of nodes is configured or designed to communicate with at least one of the plurality of intermediate network devices via at least one upstream channel and at least one downstream channel, and each of the plurality of intermediate network devices is configured or designed to communicate with the head end complex. Each of the plurality of intermediate network devices may be associated with the same IP subnet, and have associate with it a unique IP address. A data parcel is received. The data parcel includes a source address and a destination address. The data parcel is forwarded to the head end complex if at least the following conditions are satisfied: (i) the data parcel corresponds to an IP packet; and (ii) the destination address does not match the IP subnet of the local network device. The data parcel is forwarded to an appropriate port if at least the following conditions are satisfied: (i) the data parcel corresponds to an IP packet, (ii) the destination address matches the IP subnet of the local network device; and (iii) a port binding associated with the destination address is known. An Address Resolution Protocol (ARP) request is generated if at least the following conditions are satisfied: (i) the data parcel corresponds to an IP packet, (ii) the destination address matches the IP subnet of the local network device; and (iii) a port binding associated with the destination address is not known. According to a specific embodiment, the access network corresponds to a cable network; and the plurality of intermediate network devices correspond to distributed cable modem termination systems.

Alternate embodiments of the present invention are directed to various methods, devices, and computer program products for sharing a subnet of IP addresses among a plurality of network devices in an access network. In specific embodiments, the access network includes a head end complex, a plurality of nodes, and a plurality of intermediate network devices. Each of the plurality of nodes is configured or designed to communicate with at least one of the plurality of intermediate network devices via at least one upstream channel and at least one downstream channel, and each of the plurality of intermediate network devices is configured or designed to communicate with the head end complex. Each of the plurality of intermediate network devices may be associated with the same IP subnet, and have associate with it a unique IP address. At least one device of the plurality of intermediate network devices is configured to handle data parcel traffic using a traffic handling protocol which allows the at least one device to share the IP subnet of the local network device by the plurality of intermediate network devices. According to a specific embodiment, the traffic handling protocol does not use a route injection protocol to accomplish sharing of the IP subnet of the local network device by the plurality of intermediate network devices. Additionally, the traffic handling protocol does not use a bridging protocol to accomplish sharing of the IP subnet of the local network device by the plurality of intermediate network devices. Further, according to a specific embodiment, the sharing of the first IP subnet by the plurality of intermediate network devices is also accomplished without subdividing the first IP subnet into smaller subgroups.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

According to various embodiments of the present invention, an IP subnet sharing technique is described which allows multiple network devices of an access network to share an IP subnet in a manner which avoids many of the problems associated with conventional IP subnet sharing techniques, such as those described above. Using the technique of the present invention, multiple network devices are able to share an IP subnet without the need for each network device to run complex routing protocols, or bridging protocols. Further, the multiple network devices are able to share an IP subnet without the need to subdivide the IP subnet into smaller groups.

Figure 3:
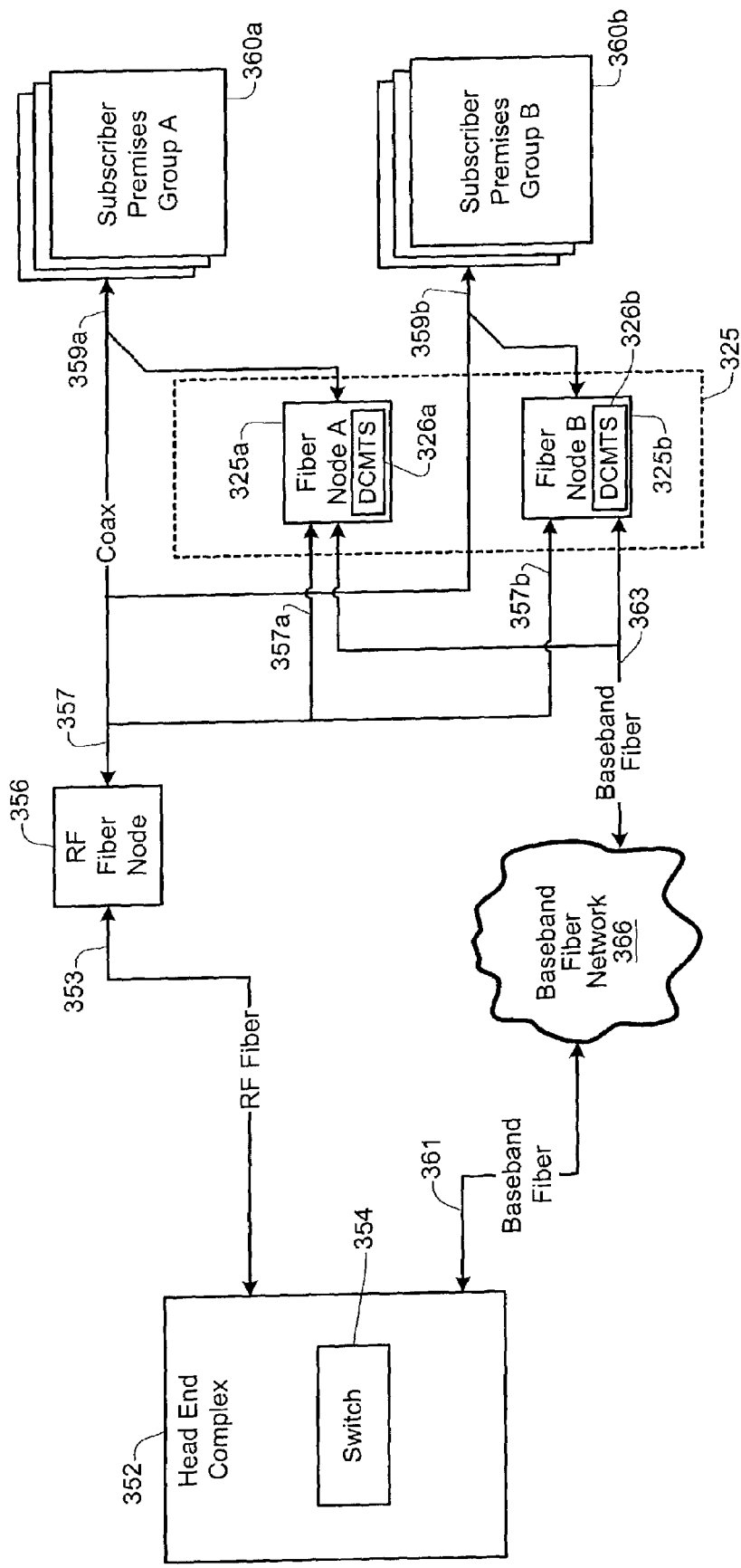
FIG. 3 illustrates an embodiment of a cable network which may be used for implementing the subnet sharing technique of the present invention.

According to a specific embodiment, the IP subnet sharing technique of the present invention may be implemented at one or more distributed cable modem termination systems (DCMTS) such as those illustrated in FIG. 3 of the drawings.

FIG. 3 illustrates an embodiment of a cable network which may be used for implementing the subnet sharing technique of the present invention. As shown in the embodiment of FIG. 3, the Head End complex 352 may include a switch 354 (e.g,. Ethernet switch), or other type of traffic handling device which may be configured to route or forward traffic between network devices in the cable network 350, or between the devices in the cable network and devices in external networks. Additionally, as shown in the embodiment of FIG. 3, a baseband fiber network 366 may be deployed which is coupled to a conventional cable network. The baseband fiber network may include a plurality of fiber nodes 325, which are also coupled to the conventional fiber network. According to a specific embodiment, each fiber node 325 may be inserted into the cable network 350 using a combiner and/or splitter which may be used to add and/or separate DOCSIS signals into/from the RF lineup.

Figure 1:
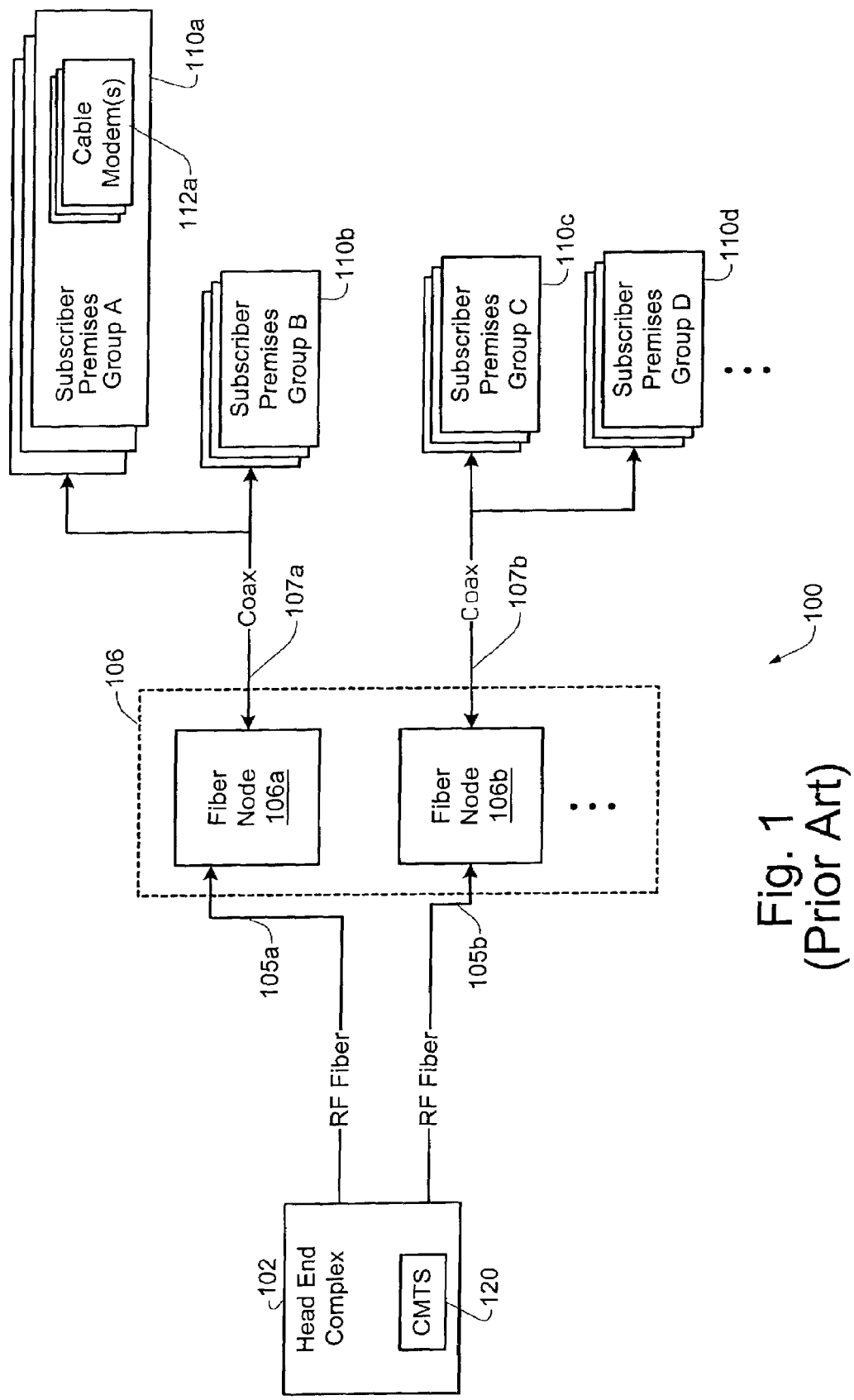
FIG. 1 shows a block diagram of a conventional two-way hybrid fiber-coaxial (HFC) cable network 100.
Figure 2:
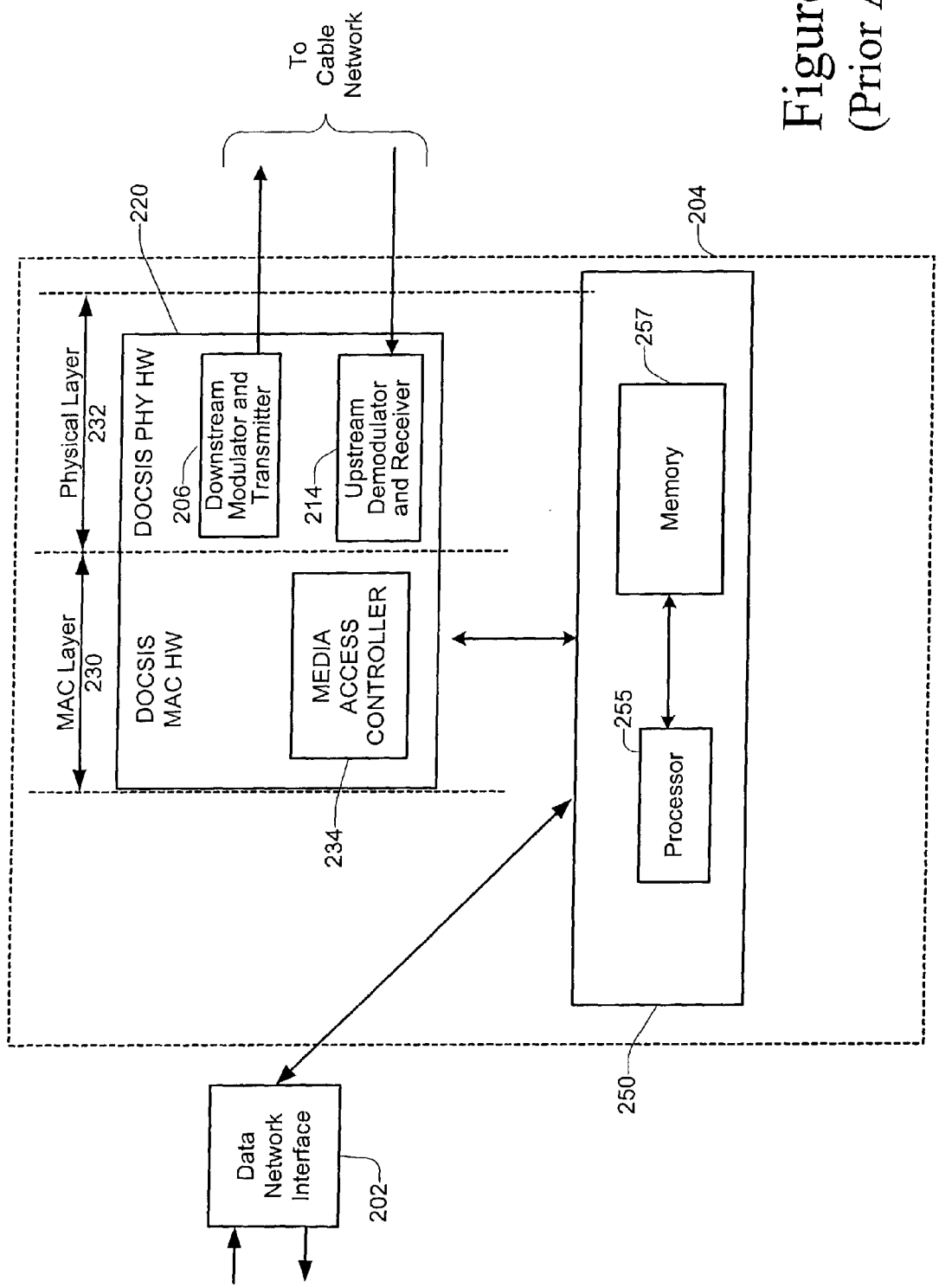
FIG. 2 provides an example of a conventional DOCSIS enabled CMTS.

Thus, as show in the embodiment of FIG. 3, the cable network 350 includes two different types of fiber nodes, namely RF fiber nodes (e.g. 356), and fiber nodes 325 (e.g. 325a, 325b). According to a specific embodiment, the RF fiber node 356 may be configured as a conventional fiber node such as fiber nodes 106 of FIG. 1. In one implementation, the RF fiber node 356 may be configured to handle all legacy RF downstream and upstream communications (such as, for example, set-top box signals, telemetry signals, etc., and communications which occur on centralized DOCSIS channels), and may be configured to perform additional functions associated with conventional fiber nodes. Communication between the Head End Complex 352 and the plurality of fiber nodes 325 may be accomplished via the baseband fiber network 366. The switch 354 may be configured to handle layer 3 functionality, including packet-related decisions, network layer decisions, IP related decisions, etc.

As illustrated in the cable network of FIG. 3, the cable network 350 may include multiple distributed CMTS (herein referred to as a "DCMTS") devices (e.g., 326a, 326b), which may be implemented at fiber nodes 325. According to specific embodiments, one or more of the DCMTS devices may be configured or designed to receive and transmit baseband optical signals from/to the Head End Complex 352 via baseband fiber network 366. In one implementation, a DCMTS may be configured to perform conversions between packet protocols implemented over the baseband fiber media (e.g. 361, 363) and DOCSIS protocols implemented on the coax media (e.g. 359a, 359b).

Additionally, according to a specific embodiments, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the Head End complex. The DCMTS may also be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc. Additionally, selected DCMTS devices may be configured to implement layer 3 functionality and/or at least a portion of the functionality performed by the various logic described with respect to FIGS. 7 and 8 of the drawings.

According to a specific implementations of the present invention, the fiber nodes 325 may be pushed deeper into the network (i.e. closer to the subscriber groups) than conventional RF fiber nodes, which, as illustrated in FIG. 3, may result in a plurality of fiber nodes 325 servicing subscriber groups (e.g. 360a, 360b) which are serviced by a single RF fiber node 356. In addition to being configured to receive baseband optical signals, the fiber nodes 325 may also be configured to receive electrical signals from the RF fiber nodes via coax lines (e.g. 357A, 357B). Such electrical signals may include, for example, clock or other timing reference signals and/or timestamp synchronization signals.

According to at least one embodiment, each DCMTS may be configured or designed to service up to 500 different subscribers. Because of the relatively small number of subscribers serviceable by each DCMTS, the provisioning of a separate IP subnet to each of the DCMTS devices would result in an inefficient utilization of IP addressing space. Additionally, it will be appreciated that the assignment of a separate IP subnet to each of the DCMTS devices presents a major provisioning obstacle since each of the DCMTS devices are typically required to be manually and individually provisioned, which requires both additional software overhead as well as additional human resource overhead. Accordingly, it is desirable to provide a mechanism which allows for the sharing of IP subnets across multiple DCMTS devices.

According to various embodiments of the present invention, an IP subsnet sharing technique is described which allows multiple network devices of an access network to share an IP subnet without the need for each network device to run complex routing protocols, or bridging protocols. Further, the multiple network devices are able to share an IP subnet without the need to subdivide the IP subnet into smaller groups. Moreover, using the technique of the present invention, IP route tables may be populated and maintained using a simple set of rules, rather than complex, standardized routing protocols, thereby eliminating the complexities of routing code and the bandwidth penalties associated with routing updates.

It will be appreciated that the IP subnet sharing technique of the present invention may be implemented in a variety of different types of access networks such as, for example, cable networks, DSL networks, FTTX networks, and/or other access networks, in order to allow various network devices in such networks to share one or more IP subnets in a manner which avoids many of the problems associated with conventional IP subnet sharing techniques.

According to one embodiment, a set of rules may be used to allow multiple network devices to share an IP subnet. In one implementation, a first rule may specify that each network device (e.g. DCMTS device) be informed of its current IP subnet assignment. Thus, according to one implementation, multiple network devices may share the same IP subnet/mask, however, each of the network devices will be assigned a unique IP address from that particular subnet.

Figure 4:
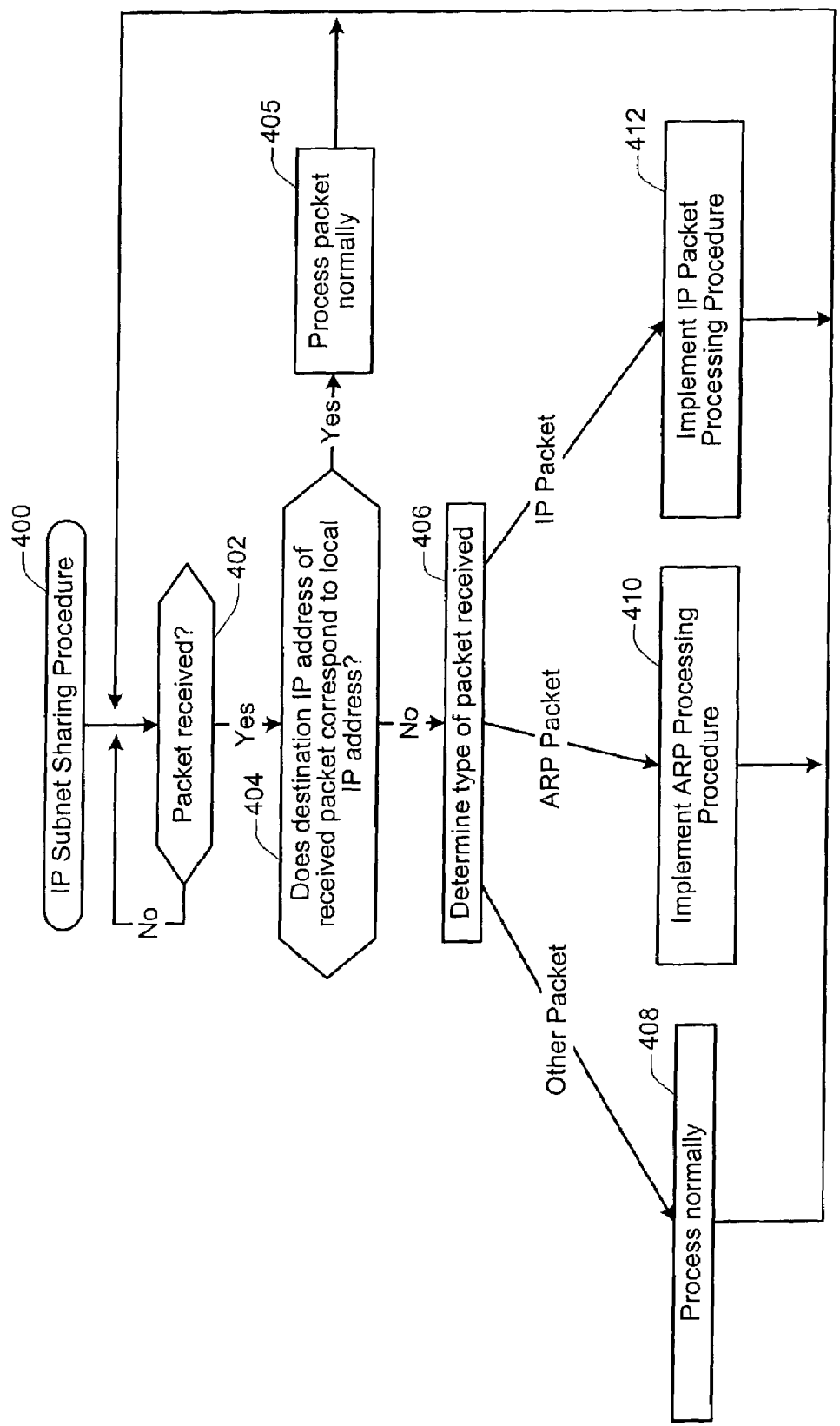
FIG. 4 shows a flow diagram of an IP Subnet Sharing Procedure 400 in accordance with a specific embodiment of the present invention.

FIG. 4 shows a flow diagram of an IP Subnet Sharing Procedure 400 in accordance with a specific embodiment of the present invention. According to specific embodiments, the IP Subnet Sharing Procedure 400 may be implemented one or more network devices in order to allow the multiple network devices to share an IP subnet without using route injection protocols, bridging protocols, or techniques which subdivide the IP subnet into smaller subnets.

Initially, when a packet is received (402) at the network device, a determination is made (404) as to whether the destination IP address of the received packet corresponds to the IP address of the local network device. If the destination IP address of the received packet does correspond to the IP address of the local network device, then the packet is processed normally (405), using, for example, conventional or standardized packet processing and/or handling techniques.

If it is determined that the destination IP address of the received packet corresponds to a network device other than the local network device, then the type of the received packet may be determined (406) or analyzed for further processing. According to a specific embodiment, if it is determined that the received packet corresponds to an IP packet, then the packet may be handled (412) using an IP Packet Processing Procedure such as that illustrated in FIG. 5 of the drawings. If it is determined that the received packet corresponds to an address resolution protocol (ARP) packet, then the packet may be handled (410) using an ARP packet processing procedure such as that illustrated in FIG. 6 of the drawings. If it is determined that the packet type of the received packet is other than an IP packet or an ARP packet, then the received packet may be processed normally (408), for example, using conventional or standardized packet processing procedures.

According to a specific embodiment the IP Subnet Sharing Procedure 400 may be implemented in a cable network such as that illustrated, for example, in FIG. 3 of the drawings, wherein a plurality of DCMTS devices 325 may be configured or designed to share an IP subnet using the IP subnet sharing technique of the present invention. Using the technique of the present invention, each of the plurality of DCMTS devices may be provisioned with the same IP subnet/mask, and assigned unique IP addresses within that subnet.

Figure 5:
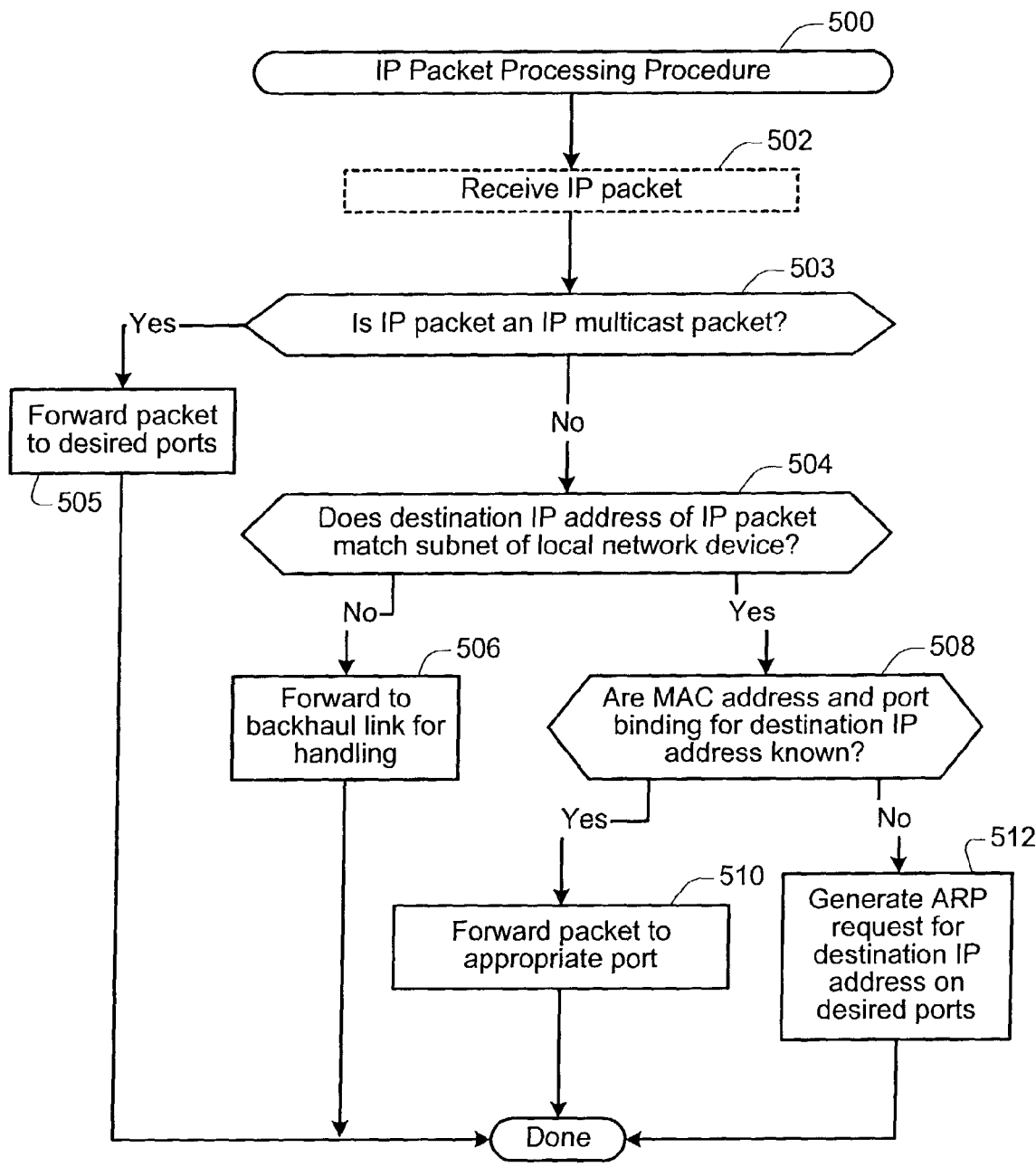
FIG. 5 shows a flow diagram of an IP Packet Processing Procedure 500 in accordance with a specific embodiment of the present invention.

FIG. 5 shows a flow diagram of an IP Packet Processing Procedure 500 in accordance with a specific embodiment of the present invention. According to specific embodiments, the IP Packet Processing Procedure 500 may be implemented at one or more network devices (e.g. DCMTS devices 362a, 362b) which are configured to share an IP subnet. For purposes of illustration, the IP Packet Processing Procedure 500 may be described by way of example using the cable network 350 of FIG. 3.

Initially, as shown at 502, it is assumed that an IP packet has been received at the network device and passed to the IP Packet Processing Procedure 500 for handling. At 503 a determination is made as to whether the received IP packet is an IP multicast packet. If it is determined that the received IP packet is an IP multicast packet, the packet may then be forwarded (505) to desired ports.

If, however, it is determined that the received IP packet is not an IP multicast packet, a determination is made (504) as to whether the destination IP address of the IP packet matches the subnet of the local network device. If it is determined that the destination IP address of the IP packet does not match the subnet of the local network device, then the IP packet is forwarded (506) to the backhaul link for handling. Thus, for example, referring to the cable network 350 of FIG. 3, if the destination address of an IP packet received at DCMTS device 326b corresponds to an IP subnet which is different than the IP subnet of DCMTS device 326b, the IP packet will be forwarded to the head end complex 352 for handling.

Returning to FIG. 5, if it is determined that the destination IP address of the IP packet matches the IP subnet of the local network device, a determination is then made (508) as to whether the MAC address and port binding for the destination IP address are known. If the MAC address and port binding associated with the destination IP address are known, then the IP packet may be forwarded (510) to the appropriate port in the network. If, however, either the MAC address and/or port binding for the destination IP address is not known, an ARP request for the destination IP address may then be generated (512) on desired ports. According to a specific implementation, the ARP request may be generated on all ports in the cable network including, for example, backhaul and cable modem ports. According to a specific embodiment, when an ARP request is generated at 512, the ARP request may be identified by the IP Subnet Sharing Procedure 400 and processed using an ARP Processing Procedure, as illustrated at 410. It will be appreciated that, in alternate embodiments, the IP packet may be forwarded to the appropriate port in the network if only the port binding (associated with the destination IP address) is known.

Figure 6:
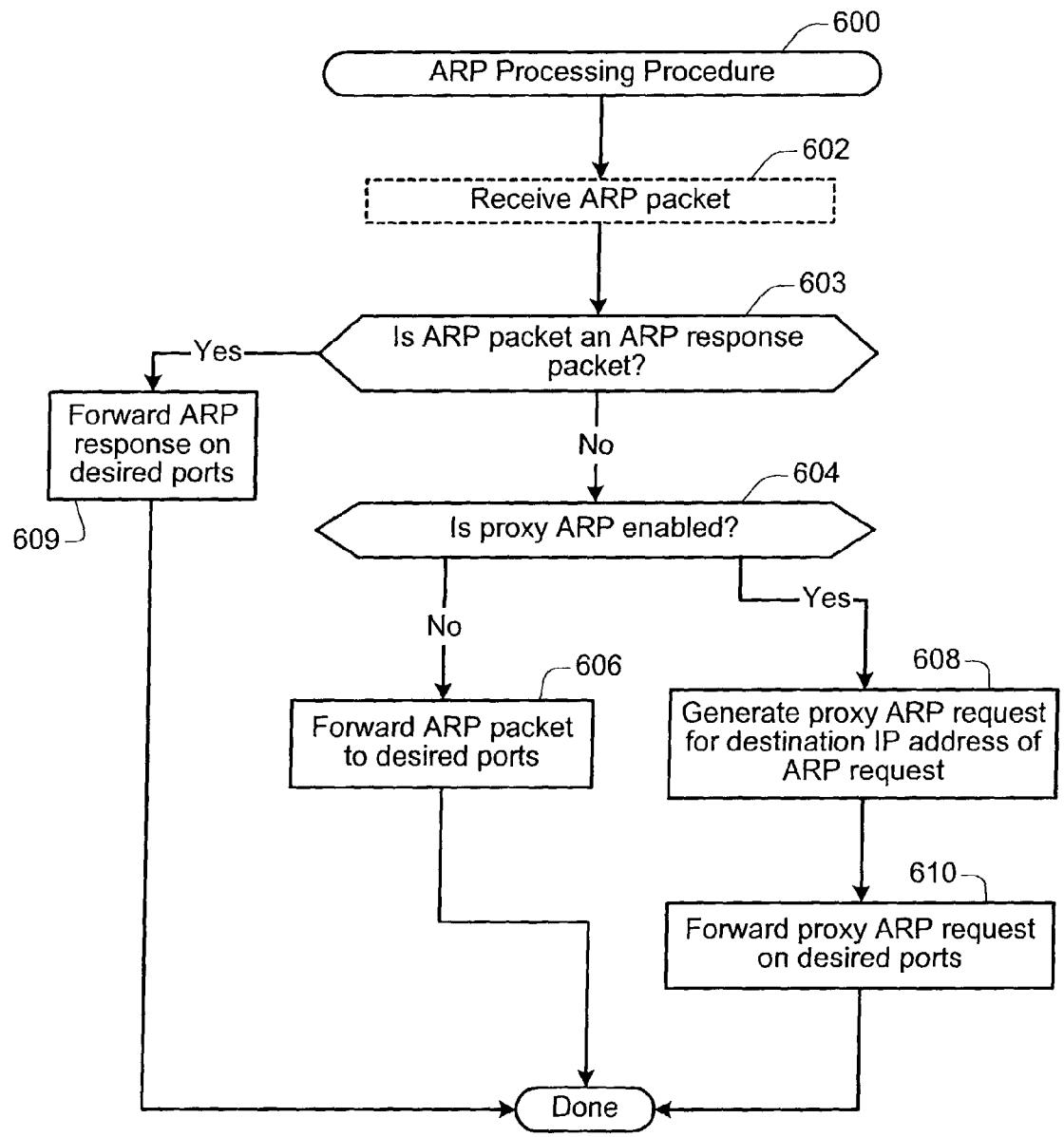
FIG. 6 shows an example of an ARP Processing Procedure 600 in accordance with a specific embodiment of the present invention.

FIG. 6 shows an example of an ARP Processing Procedure 600 in accordance with a specific embodiment of the present invention. According to specific embodiments, the ARP Processing Procedure 600 may be implemented at one or more network devices (e.g. DCMTS devices 362a, 362b) which are configured to share an IP subnet. For purposes of illustration, the ARP Processing Procedure 600 may be described by way of example using the cable network 350 of FIG. 3.

Initially, as shown at 602, it is assumed that an ARP packet has been received at the local network device and passed to the ARP Processing Procedure 600 for handling. At 603 a determination is made as to whether the received ARP packet corresponds to an ARP response packet. If it is determined that the received ARP packet corresponds to an ARP response packet, the ARP response packet may then be forwarded (609) to desired ports.

If, however, it is determined that the received ARP packet does not correspond to an ARP response packet, a determination is made (604) as to whether a proxy ARP protocol has been enabled. According to specific embodiments, proxy ARPs may be used to reduce security risks associated with the network. In one implementation, a proxy ARP request may be created for a given ARP request by substituting different source address information into the source address fields of the ARP request. For example, in at least one embodiment, a DCMTS device may intercept an ARP packet (e.g., ARP request), and generate a proxy ARP request by substituting the source addresses (e.g., MAC and/or IP addresses) of the DCMTS device into the source address field(s) of the proxy ARP request, thereby removing the source address information of the original ARP request which, for example, may be used to identify the source MAC and IP addresses of the device which generated the original ARP request.

If it is determined that a proxy ARP protocol has not been enabled, the ARP request is forwarded to desired ports in the network. According to a specific embodiment, the desired ports may include all ports in the cable network, such as, for example, backhaul and cable modem ports.

If, however, it is determined that a proxy ARP protocol has been enabled, the received ARP packet may be intercepted, and a proxy ARP request generated (608) for the destination IP address of the intercepted ARP request. According to a specific embodiment, the proxy ARP request may be generated at the DCMTS. Once generated, the proxy ARP request may then be forwarded (610) on desired ports in the network. According to a specific embodiment, the desired ports may include all ports in the cable network such as, for example, backhaul and cable modem ports.

According to specific embodiments, an ARP table may be used to build layer 2 MAC re-write strings. The information in the ARP table may be used, for example, to re-write layer 2 headers of packets to be forwarded to their final destination. Thus, for example, if the destination IP address of a received packet is on the subnet of the DCMTS, the layer 2 header of the packet may be modified using the ARP table information, and the packet then forwarded directly to the destination. If, however, the destination IP address is not on the subnet of the DCMTS, the packet may be forwarded (as is) to the back haul link, and no layer 2 MAC re-writes take place.

According to a specific implementation, an ARP table may contain logical port information. However, media/platform dependent codes may be used for translating logical port addresses (e.g., cable interface) to physical port addresses (e.g., hardware rings, cues, ports, etc.). In the case of cable interfaces, the cable specific code maintains records of the MAC address/port bindings.

It will be appreciated that, according to specific embodiments, the technique of the present invention may be used to allow multiple network devices to share an IP subnet without running routing protocols, thereby simplifying configuration of the network devices. Such an advantage is particularly useful where the network devices are implemented in unmanned or remote regions of the access network. Apart from reducing the configuration complexity of the network devices, the technique of the present invention also allows IP subnet sharing to be implemented on network devices using less memory and processing power than conventional IP subnet sharing techniques. Additionally, according to specific embodiments, there is no need to perform routine routing updates such as those typically performed by conventional routing protocols.

Further, it will be appreciated that the IP subnet sharing technique of the present invention allows multiple network devices to share an IP subnet without the need to run bridging, thereby eliminating unnecessary forwarding/flooding associated with bridging techniques. Bridging devices also have the disadvantage of indiscriminately forwarding packets, thereby causing security violation risks. The technique of the present invention also overcomes such security risks.

CMTS and DCMTS Configurations

Figure 7:
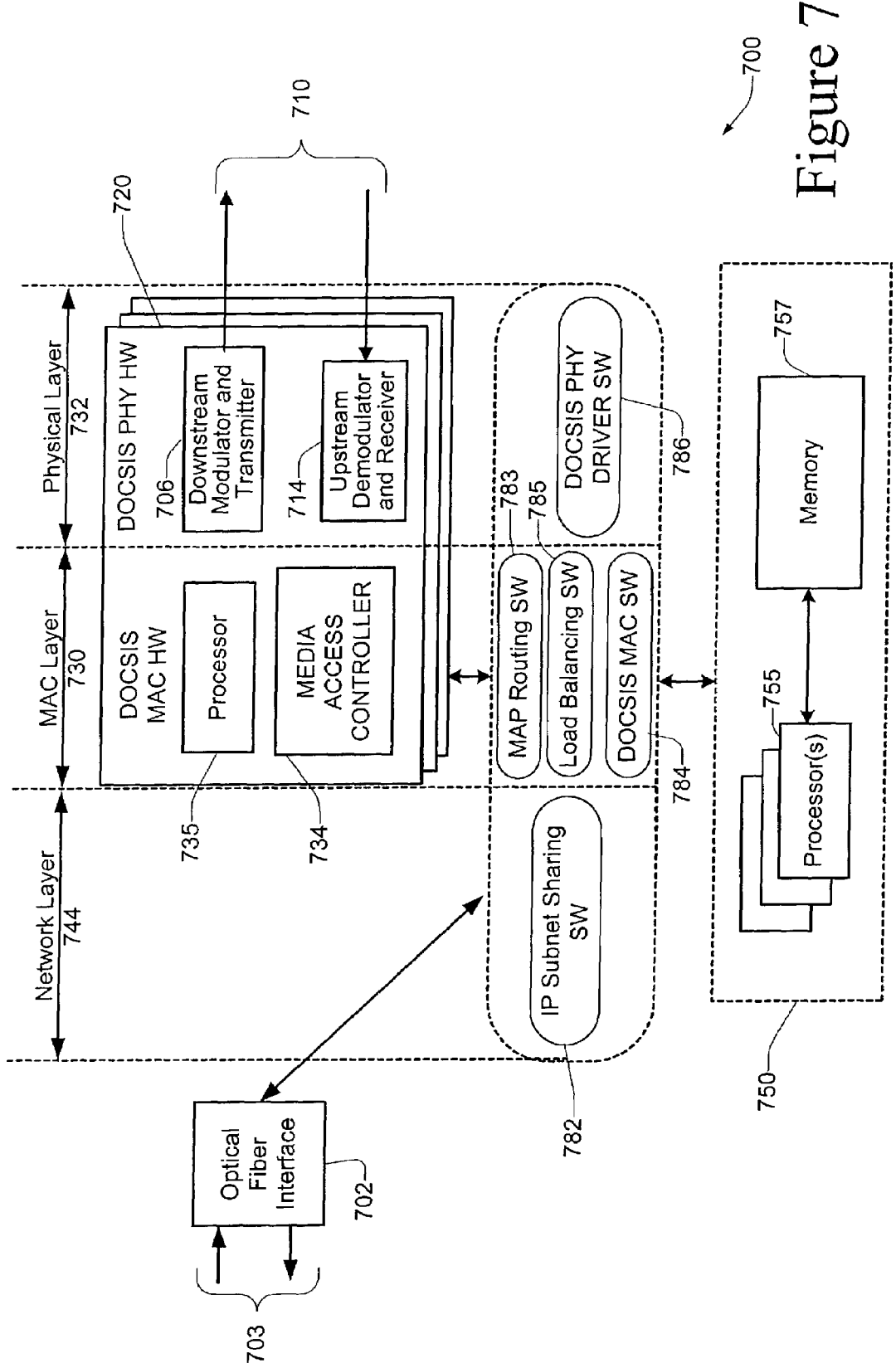
FIG. 7 provides an example of a DCMTS system 700 which may be used to implement certain aspects of this invention.

FIG. 7 provides an example of a DCMTS system 700 which may be used to implement certain aspects of this invention. In the specific embodiment as shown in FIG. 7, a DCMTS 700 provides functions on three network layers including a physical layer 732, a Media Access Control (MAC) layer 730, and a network layer 744. Generally, the physical layer is responsible for receiving and transmitting modulated signals over coax lines to the cable modems. Hardware portions of the physical layer include at least one downstream modulator and transmitter 706 and/or at least one upstream demodulator and receiver 714. The physical layer also includes software 786 for driving the hardware components of the physical layer.

Electrical upstream data signals (packets) arriving via lines 710 are demodulated by a receiver 714, and then passed to MAC layer block 730. A primary purpose of MAC layer 730 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream) or to the CMTS (if sent upstream) by a MAC layer block 730 in DCMTS 700. Note that the cable modems also include MAC addressing components. In the cable modems, these components encapsulate upstream data with a header containing the MAC address of the DCMTS and/or CMTS.

MAC layer block 730 includes a MAC layer hardware portion and a MAC layer software portion. The MAC layer hardware portion includes a MAC controller 734, and may also include a processor 735. According to a specific implementation, the processor 735 may be configure to perform functions relating to MAP routing, load balancing, etc. The MAC layer software portion may include software relating to DOCSIS MAC functionality 784, MAP routing functionality 783 (if desired), load balancing functionality 785 (if desired), etc. The MAC layer hardware and software portions operate together to provide the above-described functionality. In a preferred embodiment, MAC hardware portion 734 is distinct from a general-purpose microprocessor 755, and is dedicated to performing some MAC layer functions.

In specific DCMTS configurations, the hardware portions of the physical layer 732 and MAC layer 730 reside on physical line cards 720 within the DCMTS. The DCMTS may include a plurality of distinct line cards which service particular cable modems in the network. Each line card may be configured to have its own unique hardware portions of the physical layer 732 and MAC layer 730.

After MAC layer block 730 has processed the upstream information, it is then passed to network layer block 744. According to a specific implementation, the network layer block 744 includes IP subnet sharing software 782 which, for example, may include computer code or instructions for implementing the procedures illustrated in FIGS. 4–6 of the drawings.

According to a specific embodiment, the optical fiber interface 702 may also include a laser and optical-electrical signal conversion componentry for converting optical signal into electrical signals and vice-versa. In the specific embodiment of FIG. 7, the optical fiber interface 702 is configured to communicate with a CMTS (not shown) via baseband optical fibers 703.

When a packet is received at the optical fiber interface 702 from the CMTS, the network layer 744 passes the packet to MAC layer 730. MAC block 700 then transmits information via a one-way communication medium to downstream modulator and transmitter 706. Downstream modulator and transmitter 706 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

Note that alternate embodiments of the DCMTS (not shown) may not include network layer 744. In such embodiments, a DCMTS device may include only a physical layer and a MAC layer, which are responsible for modifying a packet according to the appropriate standard for transmission of information over a cable modem network. The network layer 744 of these alternate embodiments of DCMTS devices may be included, for example, as part of a conventional router for a packet-switched network. In a specific embodiment, the network layer of the DCMTS is configured as a line card coupled to a standard router that includes the physical layer block 732 and MAC layer block 730. According to an alternate embodiment, the DCMTS may be configured to include all or a selected portion of the functionality implemented at a conventional CMTS. In this latter embodiment, the DCMTS devices may be configured to handle conventional CMTS functionality, and may be aggregated via a router or switch at the Head End (illustrated, for example, in FIG. 9).

As shown in FIG. 7, DCMTS 700 includes a central hardware block 750 including one or more processors 755 and memory 757. These hardware components interact with software and other hardware portions of the various layers within the DCMTS. They provide general purpose computing power for much of the software. Memory 757 may include, for example, I/O memory (e.g. buffers), program memory, shared memory, etc. One or more data structures used for implementing the technique of the present invention may reside in such memory. Hardware block 750 may physically reside with the other DCMTS components. In one embodiment, the software entities 782, 784, and 786 are implemented as part of a network operating system running on hardware 750. According to a specific implementation, at least a part of the IP subnet sharing functionality of this invention are implemented in software as part of the operating system. In FIG. 7, such software may be part the IP subnet sharing software 782, or may be closely associated therewith. Of course, the IP subnet sharing logic of the present invention could reside in hardware, software, or some combination of the two.

According to a specific embodiment, the procedures employed by the DCMTS during registration and pre-registration are performed at the MAC layer of the DCMTS logic. Thus, in DCMTS 700, most of the registration operations would be performed by the hardware and software provided for MAC layer logic 730. Additionally, the operations associated with obtaining an IP address for cable modems may be implemented at the network layer level 744.

In a specific embodiment, the DCMTS systems of this invention may be specially configured CMTSs or routers such as, for example, specially configured models in the uBR-7200 series and uBR-10012 series of CMTSs available from Cisco Systems, Inc. of San Jose, Calif. In an alternative embodiment, the the invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific DCMTS architecture of the present invention, it is by no means the only DCMTS architecture on which the present invention can be implemented. For example, other types of interfaces and media could also be used with the DCMTS.

Regardless of network device's configuration (for cable plants or otherwise), it may employ one or more memories or memory modules (e.g., memory 757) configured to store program instructions for the network operations and other functions of the present invention described herein. The program instructions may specify an operating system and one or more applications, for example. Such memory or memories may also be configured to store data structures or other specific non-program information described herein.

Figure 8:
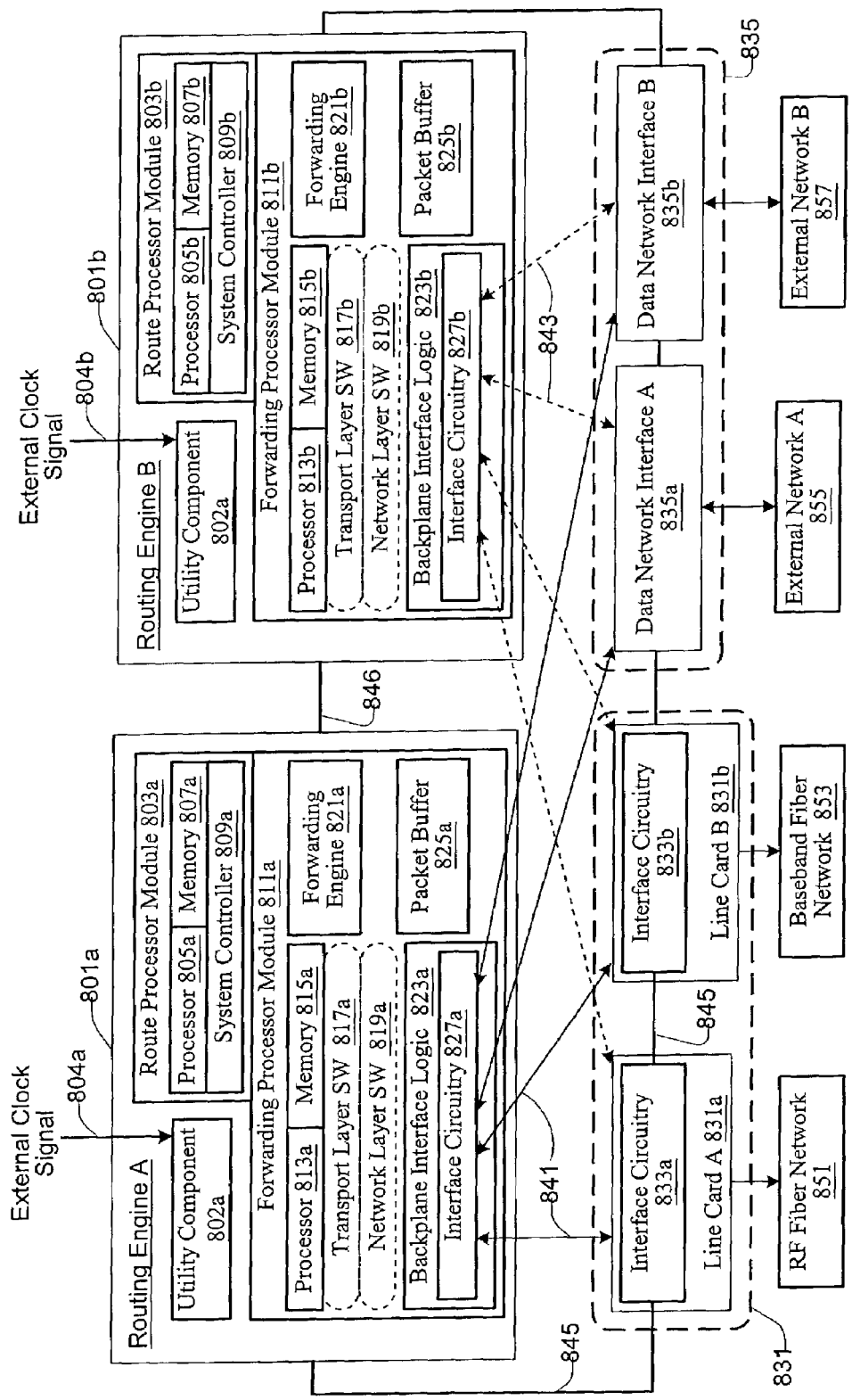
FIG. 8 shows a block diagram of a specific embodiment of a Cable Modem Termination System (CMTS) 800 which may be used to implement certain aspects of the present invention.

FIG. 8 shows a block diagram of a specific embodiment of a Cable Modem Termination System (CMTS) 800 which may be used to implement certain aspects of the present invention. According to specific embodiments, all or selected portions of the functionality of the CMTS 800 of FIG. 8 may be implemented at the distributed CMTS 602 of FIG. 6.

As shown in FIG. 8, the CMTS 800 may comprise a plurality of routing engines (e.g. 801a, 801b). In a specific implementation, Routing Engine A 801a may be configured as a primary or working routing engine, while Routing Engine B 801b may be configured as a backup or standby routing engine which provides redundancy functionality.

As shown in the embodiment of FIG. 8, each of the routing engines may include a variety of similar modules and/or components. In order to avoid confusion, the various components and/or modules relating to Routing Engine A 801a will now be described in greater detail with the understanding that such descriptions may also be applied to the corresponding components and modules of Routing Engine B 801b.

According to a specific embodiment, Routing Engine A may be configured or designed to include a plurality of functionally different modules or components, including, for example, a Forwarding Processor (FP) Module 811a adapted to provide packet forwarding functionality; a Route Processor (RP) Module 803a adapted to implement routing or forwarding operations; a utility component 802a adapted to provide system clock and timestamp functionality; etc. The routing engine components provide may be configured to provide layer one, layer two, layer three and layer four functionality as well as quality of service (QoS) functionality.

According to a specific implementation, the RP Module 803a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 8, the RP Module 803a comprises a general-purpose processor 805a (e.g., a MIPS route processor) coupled to a system controller 809a and memory 807a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 807a may comprise synchronous dynamic random access memory (SDRAM) storage locations addressable by the processor 805a for storing software programs and data structures accessed by the components. A network routing operating system, portions of which may reside in memory and executed by the route processor, functionally organizes the router by invoking network operations in support of software processes executing on the router.

The RP processor 805a may be configured to construct and load routing tables used by the FP Module 811a. The processor 805a may also be configured or designed to perform configuration management functions of the routing engine 801a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 827a may be coupled to the respective interface circuitry 833a, 833b of line cards 831a, 831b. According to a specific implementation, interface circuitry 827a may be configured to reside on a backplane logic circuit 823a of the routing engine. In one example, the backplane logic circuit 823a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 825a and a forwarding engine 821a of the FP Module 811a. The packet buffer 825a may include memory which is configured to store packets as the forwarding engine 821a performs its packet forwarding functions. For example, the packet buffer may be used to store low priority data packets while high priority, low latency voice packets are forwarded by the forwarding engine to a data network interface 835a. According to various embodiments, the FP Module 811 may comprise a processor 813a and memory 815a for handling transport layer 817 and network layer 819 functionality. In one implementation, the processor 813a may be configured to track accounting, port, and billing information for various users on a cable modem network 851. The processor 813a may also be configured to maintain desired service flow or session state information in memory 815a such as, for example, for voice calls initiated over the cable modem network. The FP Module 811a may also be configured to provide transaction compacting functionality, data parcel tunneling functionality, switching functionality, and other functionality described herein.

According to a specific implementation, Routing Engine A 801a may be connected to Routing Engine B 801b via at least one link 846, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 831, 835)

via point-to-point links. For example, as shown in FIG. 8, each of the plurality of line cards 831 and 835 are connected to each of the routing engines 801a, 801b via point-to-point links 841 and 843. One advantage of the point-to-point link configuration is that it provides additional reliability in that the failure of one or more line cards will not interfere with communications between other line cards and the routing engine(s). For example, if Line Card A 831a suddenly failed, each of the routing engines would still be able to communicate with the other line cards.

According to a specific embodiment, the plurality of line cards may include different types of line cards which have been specifically configured to perform specific functions. For example, Line Card A 831 a may correspond to radio-frequency (RF) line card which has been configured or designed to transmit and receive RF modulated optical signals. Line Card B 831b may correspond to baseband line card which has been configured or designed to transmit and receive baseband optical signals. Additionally, line cards 835 may correspond to network interface cards which have been configured or designed to interface with different types of external networks (e.g. WANs, LANs) utilizing different types of communication protocols (e.g. Ethernet, Frame Relay, ATM, TCP/IP, etc). For example. the data network interface 835a functions as an interface component between external data sources and the cable system. The external data sources transmit data to the data network interface 835a via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 819a.

According to a specific implementation, the operations associated with obtaining an IP address for cable modems may be implemented by the network layer software. This may involve the CM communicating with a DHCP server (not shown) via a data network interface, for example.

As shown in FIG. 8, at least a portion of the line cards includes interface circuitry for providing an appropriate interface between the host line card, other line cards, and/or the routing engine(s). For example, interface circuitry 833a may include interconnect ports coupled to one or more of the point-to-point links 841, 843. According to a specific implementation, the interface circuitry functions as a translator that converts conventional formats of data received at the line cards to a suitable protocol format for transmission from the line card to the appropriate routing engine. In one implementation, the interface circuitry 833a may also include circuitry to perform cyclic redundancy code (CRC) generation and checking on packets, along with interconnect format checking.

According to a specific embodiment, the point-to-point links 841, 843 may be configured as clock forwarded links such that each point-to-point link comprises at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (801a, 801b) and a portion of the cable network. The data network interface 835a may couple the routing engine 801a to an external data network 855 such as, for example, the Internet.

According to one embodiment, all or selected lines cards, routing engines and/or data network interfaces may be configured to use at least one common dedicated line or backplane (e.g. 845). According to other embodiments, the routing engines 801a, 801b may have an additional dedicated connection(s) for supporting redundancy. In a specific implementation, the backplane may be configured as an Ethernet medium that is shared by the CMTS. When the line cards are inserted into the backplane, they communicate with the routing engines over the lines 845 in accordance with a "capabilities" exchange that identifies the types of line cards and their various characteristics/parameters.

According to a specific implementation, during initialization of the CMTS, the routing engines 801a and 801b negotiate for working routing engine status over the backplane. Assertion of working status causes the line cards 831 to configure their respective interface circuitry to communicate with the designated working routing engine (e.g. Routing Engine A 801a). The Routing Engine A 801a then configures the CMTS and line cards, establishes routing relationships, and initiates traffic forwarding operations. The redundant routing engine 801b may complete a self-test and perform initialization of its various functions. The two routing engine assemblies may then exchange conventional negotiation messages (which may include, for example, health and status messages) via the backplane lines 845. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 801b detects that the primary routing engine has failed, the redundant routing engine may take over as the new working routing engine, and initiate a "cutover" operation to thereby cause the line card interface circuitry (e.g. 833a, 833b) to identify and communicate with the new working routing engine 801b. The new working routing engine 801b may then access and retrieve state information (such as, for example, telephone call state information, service flow state information, etc.) stored on selected line cards in order to maintain existing service flows.

Prior to a failure situation, the redundant routing engine 801b may be configured to monitor the status of the working routing engine 801a, and may further be configured or designed to receive updated configuration, transaction and/or state information, which may then be stored in an appropriate location in the redundant routing engine 801b.

The line cards may further comprise circuitry for "looping" packets back onto the redundant routing engine 801b over the point-to-point links. This allows the redundant routing engine 801b to send and receive test packets to evaluate its own operation in addition to the operation of the dedicated lines prior to the occurrence of a system failure.

Although the system shown in FIG. 8 represents one specific CMTS architecture of the present invention, it is by no means the only CMTS architecture on which the present invention can be implemented. For example, other types of interfaces and media could also be used with the CMTS. According to different embodiments, the CMTS system of the present invention may be implemented as a "routing" CMTS which handles at least some routing functions. Alternatively, the CMTS may be a "bridging" CMTS which handles only lower-level tasks.

Regardless of the network device's configuration (for cable plants or otherwise), it may employ one or more memories or memory modules (e.g., memory 807*a*, 815*a*, etc.) configured to store program instructions for the network operations and other functions of the present invention described herein. The program instructions may specify an operating system and one or more applications, for example. Such memory or memories may also be configured to store data structures, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Aspects of the invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated that, according to specific embodiments, the IP subnet sharing technique of the present invention may be implemented in a variety of different cable network configurations. For example, according to one embodiment, as shown, for example, in FIG. 9, the cable network may include a Head End complex which comprises various components and/or systems such as, for example, a Head End, a super Head End, a hub, a primary hub, a second hub, etc.

Figure 9:
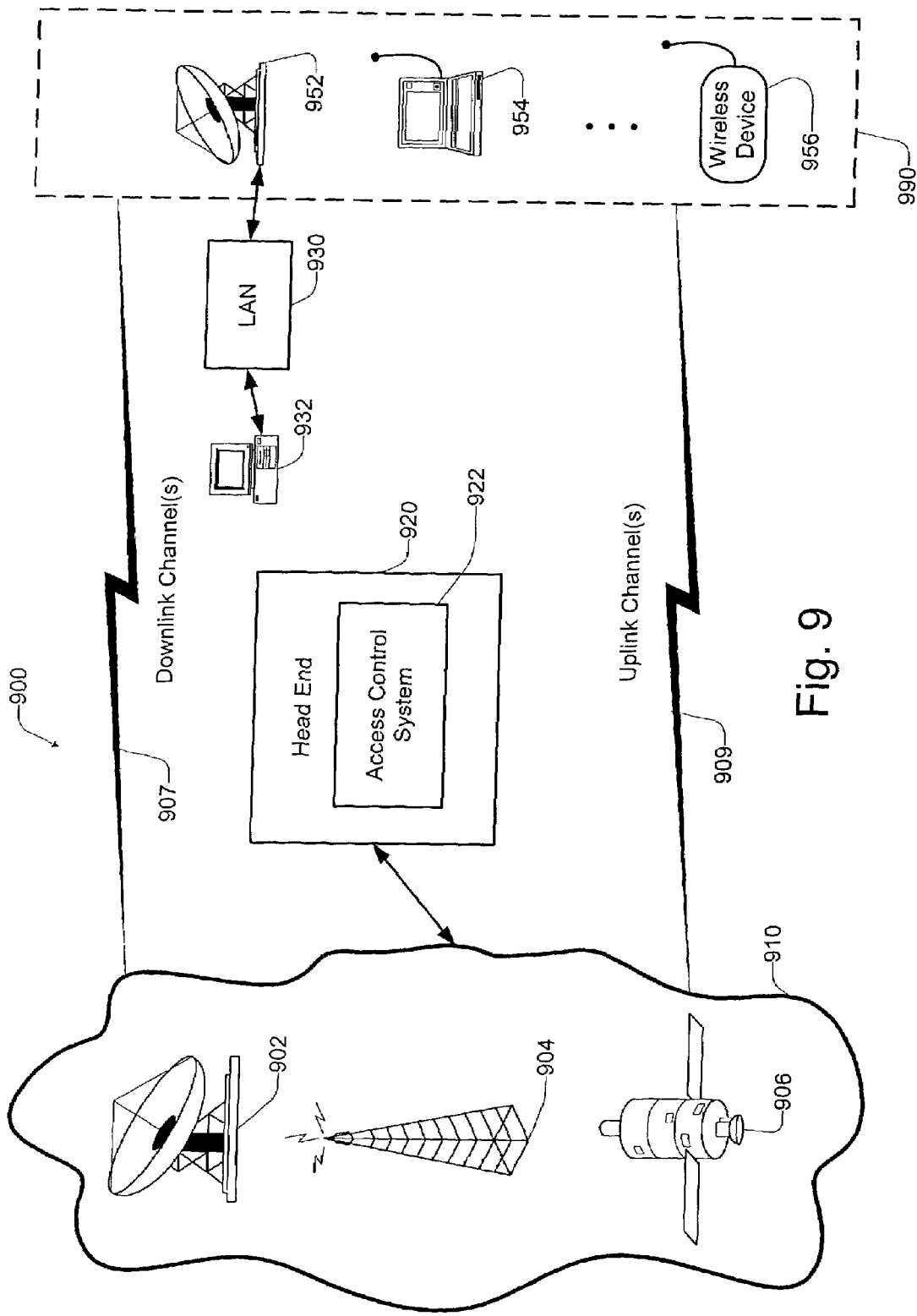
FIG. 9 shows an example of a wireless data communication system 900 which may be used for implementing the technique of the present invention.

Further, it will be appreciated that, according to a specific embodiments, at least a portion of functions described herein which are performed by the DCMTS (e.g. FIG. 7), CMTS (e.g. FIG. 8), or selected components thereof, may be implemented in a centralized CMTS system (e.g. residing the Head End of the cable network, as shown, for example, in FIG. 5), and/or may be implemented at one or more distributed CMTS (DCMTS) systems (e.g. residing at one or more fiber nodes, as shown, for example, in FIG. 9).

It will be appreciated that, according to a specific embodiments, at least a portion of functions described herein which are performed by the DCMTS (e.g. FIG. 7), and/or selected components thereof, may be implemented in a centralized CMTS system (e.g. residing at the Head End Complex of the cable network, as shown, for example, in FIG. 3), or vice versa.

Further, it will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Other Embodiments

Figure 10:
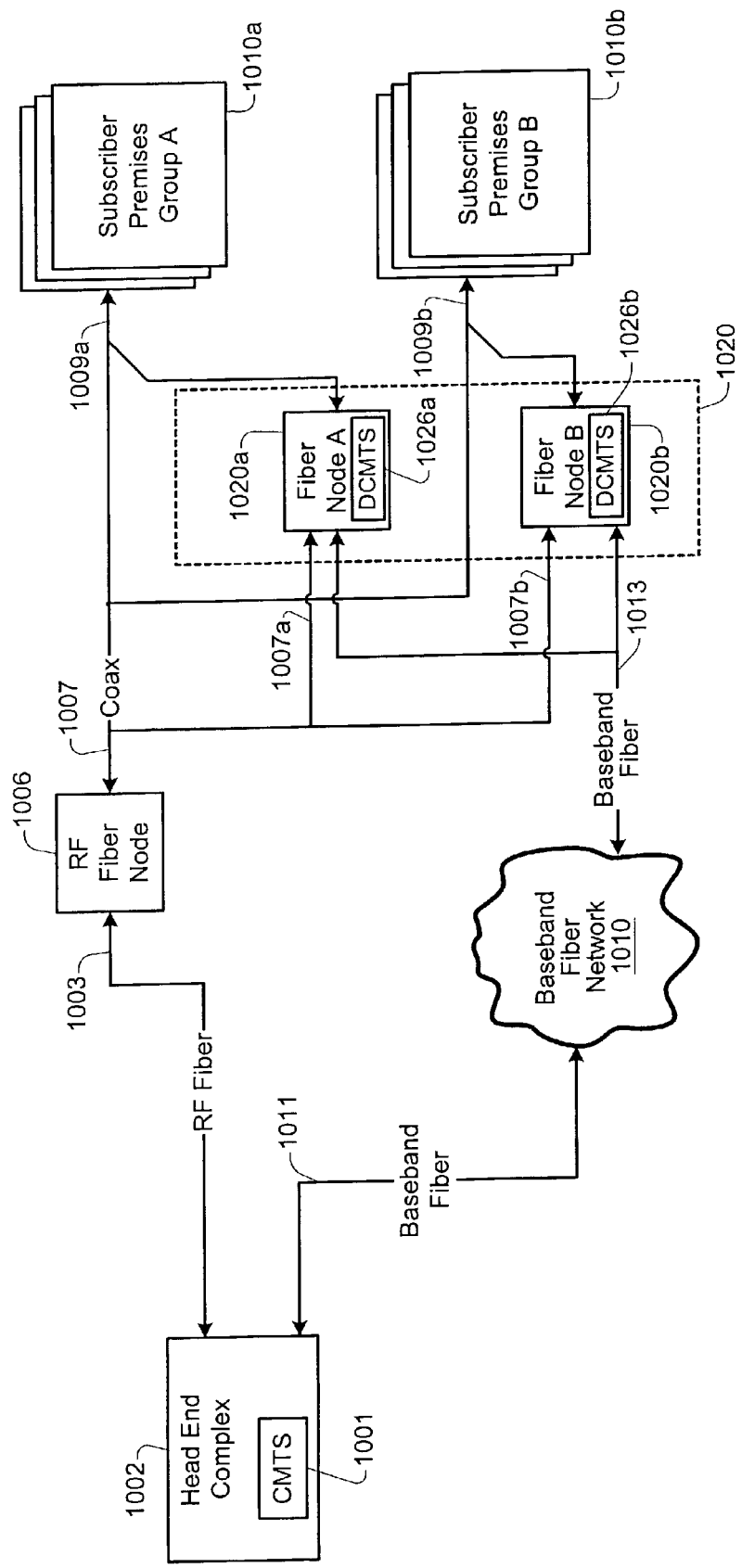
FIG. 10 illustrates an alternate embodiment of a cable network which may be used for implementing the interface technique of the present invention.

FIG. 10 illustrates an alternate embodiment of a cable network which may be used for implementing the interface technique of the present invention. In the embodiment of FIG. 10, the Head End complex 1002 includes a centralized CMTS device 1001 which may be configured to implement DOCSIS functionality. A specific embodiment of the CMTS 1001 is described in greater detail below with respect to FIGS. 8 of the drawings.

As show in FIG. 10, the cable network 1000 includes two different types of fiber nodes, namely RF fiber nodes (e.g. 1006), and fiber nodes (e.g. 1020*a*, 1020*b*). According to a specific embodiment, the RF fiber node 1006 may be configured as a conventional fiber node such as fiber nodes 106 of FIG. 1. According to a specific implementation, the RF fiber node 1006 may be configured to handle all legacy RF downstream and upstream communications (such as, for example, set-top box signals, telemetry signals, etc., and communications which occur on centralized DOCSIS channels), and may be configured to perform additional functions associated with conventional fiber nodes.

As shown in the embodiment of FIG. 10, a baseband fiber network 1016 may be deployed which is coupled to the conventional cable network. The baseband fiber network may include a plurality of fiber nodes 1020, which are also coupled to the conventional fiber network. Each fiber node may be inserted into the cable network 1000 using a combiner and/or splitter which may be used to add and/or separate DOCSIS signals into/from the RF lineup.

Communication between the Head End Complex 1002 and the plurality of fiber nodes 1020 may be accomplished via the baseband fiber network 1016. The CMTS 1001 may be configured to handle layer 3 functionality, including packet-related decisions, network layer decisions, IP related decisions, etc. Additionally, according to a specific implementation, the CMTS may also be responsible for handing redundancy and/or failover functionality for selected DCMTS devices.

According to specific embodiments of the present invention, each fiber node may include a distributed CMTS device (herein referred to as a "DCMTS"), which is configured to receive and transmit baseband optical signals from/to the Head End Complex 1002 via baseband fiber network 1016. According to a specific implementation, the DCMTS may be configured to perform conversions between packet protocols implemented over the baseband fiber media (e.g. 1011, 1013) and DOCSIS protocols implemented on the coax media (e.g. 1009*a*, 1009*b*). According to a specific embodiment, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the Head End complex. Additionally, the DCMTS may be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc.

According to a specific implementations of the present invention, the fiber nodes may be pushed deeper into the network (i.e. closer to the subscriber groups) than conventional RF fiber nodes, which, as illustrated in FIG. 10, may result in a plurality of fiber nodes 1020 servicing subscriber groups (e.g. 1010*a*, 1010*b*) which are serviced by a single RF fiber node 1006. For example, the RF fiber node 1006 may be configured to service 1000 households past (HHP) while each fiber node may be configured to service 100 households past, resulting in 2 fiber nodes (1020*a*, 1020*b*) servicing the 1000 households which are serviced by the RF fiber node 1006.

In addition to being configured to receive baseband optical signals, the fiber nodes 1020 may also be configured to receive electrical signals from the RF fiber nodes via coax lines (e.g. 1007A, 1007B). Such electrical signals may include, for example, clock or other timing reference signals and/or timestamp synchronization signals.

While the discussion to this point has focused on interface techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing interface capability in a network having at least one traffic handling device (e.g., another switch or router) that provides normal service to a host. In the wireless system (e.g., represented by FIG. 9) the plurality of nodes or hosts corresponds to the plurality of wireless nodes 950 which use at least one shared access channel to communicate with at least one access control system 922 located at the Head End of the wireless system.

FIG. 9 shows an example of a wireless data communication system 900 which may be used for implementing the technique of the present invention. As shown in FIG. 9, the wireless system includes a central termination system (or Head End) 920. The Head End includes an access controller or access control system (ACS) 922 which communicates with a plurality of wireless nodes 950, and coordinates access between each of the wireless nodes and the Head End 920. The access controller 922 may include memory and at least one processor. In a specific embodiment, the function of the access controller 922 is analogous to that of the CMTS described above with respect to cable modem networks. It may serve as a router or switch as well.

The Head End 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the Head End 920 of the wireless computer system communicates with the plurality of nodes 950 via one or more downlink channels 907 and one or more uplink channels 909. Each downlink channel 907 is a broadcast-type channel utilized by the Head End to communicate with an associated group of wireless nodes within the wireless network. The uplink channel 909 is a shared-access channel, which is utilized by a group of wireless nodes (analogous to cable modems) to communicate with the Head End 920. The access controller 922 stores registration parameters for the various nodes that it services. It may also store the IP addresses for nodes that it services.

In a specific embodiment of the present invention, the registration process and information is similar to that of the cable network CMTSs described above. Moreover, the technique of the present invention for interface capability over a shared access data network may be implemented in wireless system 900.

The wireless devices or nodes 950 may include any one of a number of wireless transmitting/receiving devices. For example, a satellite dish 952 may be used to communicate with the Head End 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the Head End via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described interface techniques may easily be implemented in wireless system 900 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for sharing a subnet of IP addresses among a plurality of network devices in an access network, the access network including a head end complex, a plurality of nodes, and a plurality of intermediate network devices; each of the plurality of nodes being configured or designed to communicate with at least one of the plurality of intermediate network devices via at least one upstream channel and at least one downstream channel; each of the plurality of intermediate network devices being configured or designed to communicate with the head end complex; each of the plurality of intermediate network devices being associated with a first IP subnet; each of the plurality of intermediate network devices having a unique IP address associated therewith, the method comprising:

(a) receiving a first data parcel, the first data parcel including first source address information and first destination address information;

(b) forwarding the first data parcel to the head end complex if at least the following conditions are satisfied:

(i) the first data parcel corresponds to an IP packet; and (ii) the first destination address information does not match the first IP subnet;

(c) forwarding the first data parcel to an appropriate port if at least the following conditions are satisfied:
  (i) the first data parcel corresponds to an IP packet;
  (ii) the first destination address information matches the first IP subnet; and
  (iii) a port binding associated with the destination address information is known; and
(d) generating an Address Resolution Protocol (ARP) request if at least the following conditions are satisfied:
  (i) the first data parcel corresponds to an IP packet;
  (ii) the first destination address information matches the first IP subnet; and
  (iii) a port binding associated with the destination address information is not known.

2. The method of claim 1 further comprising:
forwarding the first data parcel to an appropriate port if a MAC address binding associated with the destination address information is also known; and
generating an Address Resolution Protocol (ARP) request if the MAC address binding associated with the destination address information is not known.

3. The method of claim 1 wherein the sharing of the first IP subnet by the plurality of intermediate network devices is accomplished without using a route injection protocol.

4. The method of claim 1 wherein the sharing of the first IP subnet by the plurality of intermediate network devices is accomplished without using a binding protocol to share the first IP subnet among the plurality of intermediate network devices.

5. The method of claim 1 wherein the access network corresponds to a cable network; and
wherein the plurality of intermediate network devices correspond to distributed cable modem termination systems.

6. A network device adapted to share a subnet of IP addresses among a plurality of network devices in an access network, the access network including a head end complex, a plurality of nodes, and a plurality of network devices; each of the plurality of nodes being configured or designed to communicate with at least one of the plurality of network devices via at least one upstream channel and at least one downstream channel; each of the plurality of network devices being configured or designed to communicate with the head end complex; each of the plurality of network devices being associated with a first IP subnet; each of the plurality of network devices having a unique IP address associated therewith; the network device comprising:
at least one processor;
at least one interface configured or designed to provide a communication link to at least one other network device in the access network; and
memory;
the network device being configured or designed to:
(a) receive a first data parcel, the first data parcel including first source address information and first destination address information;
(b) forward the first data parcel to the head end complex if at least the following conditions are satisfied:
  (i) the first data parcel corresponds to an IP packet; and
  (ii) the first destination address information does not match the first IP subnet;
(c) forward the first data parcel to an appropriate port if at least the following conditions are satisfied:
  (i) the first data parcel corresponds to an IP packet;
  (ii) the first destination address information matches the first IP subnet; and
  (iii) a port binding associated with the destination address information is known; and
(d) generate an Address Resolution Protocol (ARP) request if at least the following conditions are satisfied:
  (i) the first data parcel corresponds to an IP packet;
  (ii) the first destination address information matches the first IP subnet; and
  (iii) a port binding associated with the destination address information is not known.

7. The network device of claim 6 being further configured or designed to:
forward the first data parcel to an appropriate port if a MAC address binding associated with the destination address information is also known; and
generate an Address Resolution Protocol (ARP) request if the MAC address binding associated with the destination address information is not known.

8. The network device of claim 6 wherein the sharing of the first IP subnet by the plurality of network devices is accomplished without using a route injection protocol.

9. The network device of claim 6 wherein the sharing of the first IP subnet by the plurality of network devices is accomplished without using a binding protocol to share the first IP subnet among the plurality of network devices.

10. The network device of claim 6 wherein the access network corresponds to a cable network; and
wherein the plurality of network devices correspond to distributed cable modem termination systems.

11. A computer program product for sharing a subnet of IP addresses among a plurality of network devices in an access network, the access network including a head end complex, a plurality of nodes, and a plurality of intermediate network devices; each of the plurality of nodes being configured or designed to communicate with at least one of the plurality of intermediate network devices via at least one upstream channel and at least one downstream channel; each of the plurality of intermediate network devices being configured or designed to communicate with the head end complex; each of the plurality of intermediate network devices being associated with a first IP subnet; each of the plurality of intermediate network devices having a unique IP address associated therewith, the computer program product comprising:
a computer readable storage medium having computer readable code embodied therein, the computer readable code comprising:
(a) computer code for receiving a first data parcel, the first data parcel including first source address information and first destination address information;
(b) computer code for forwarding the first data parcel to the head end complex if at least the following conditions are satisfied:
  (i) the first data parcel corresponds to an IP packet; and
  (ii) the first destination address information does not match the first IP subnet;
(c) computer code for forwarding the first data parcel to an appropriate port if at least the following conditions are satisfied:
  (i) the first data parcel corresponds to an IP packet;
  (ii) the first destination address information matches the first IP subnet; and
  (iii) a port binding associated with the destination address information is known; and
(d) computer code for generating an Address Resolution Protocol (ARP) request if at least the following conditions are satisfied:
  (i) the first data parcel corresponds to an IP packet;

(ii) the first destination address information matches the first IP subnet; and (iii) a port binding associated with the destination address information is not known.

12. The computer program product of claim 11 further comprising:

computer code for forwarding the first data parcel to an appropriate port if a MAC address binding associated with the destination address information is also known; and computer code for generating an Address Resolution Protocol (ARP) request if the MAC address binding associated with the destination address information is not known.

13. The computer program product of claim 11 wherein the sharing of the first IP subnet by the plurality of intermediate network devices is accomplished without using a route injection protocol.

14. The computer program product of claim 11 wherein the sharing of the first IP subnet by the plurality of intermediate network devices is accomplished without using a binding protocol to share the first IP subnet among the plurality of intermediate network devices.

15. The computer program product of claim 11 wherein the access network corresponds to a cable network; and wherein the plurality of intermediate network devices correspond to distributed cable modem termination systems.

16. A system for sharing a subnet of IP addresses among a plurality of network devices in an access network, the access network including a head end complex, a plurality of nodes, and a plurality of intermediate network devices; each of the plurality of nodes being configured or designed to communicate with at least one of the plurality of intermediate network devices via at least one upstream channel and at least one downstream channel; each of the plurality of intermediate network devices being configured or designed to communicate with the head end complex; each of the plurality of intermediate network devices being associated with a first IP subnet; each of the plurality of intermediate network devices having a unique IP address associated therewith, the system comprising:

(a) means for receiving a first data parcel, the first data parcel including first source address information and first destination address information;

(b) means for forwarding the first data parcel to the head end complex if at least the following conditions are satisfied:
 (i) the first data parcel corresponds to an IP packet; and
 (ii) the first destination address information does not match the first IP subnet;

(c) means for forwarding the first data parcel to an appropriate port if at least the following conditions are satisfied:
 (i) the first data parcel corresponds to an IP packet;
 (ii) the first destination address information matches the first IP subnet; and
 (iii) a port binding associated with the destination address information is known; and (d) means for generating an Address Resolution Protocol (ARP) request if at least the following conditions are satisfied:
 (i) the first data parcel corresponds to an IP packet;
 (ii) the first destination address information matches the first IP subnet; and
 (iii) a port binding associated with the destination address information is not known.

17. The system of claim 16 further comprising:

means for forwarding the first data parcel to an appropriate port if a MAC address binding associated with the destination address information is also known; and means for generating an Address Resolution Protocol (ARP) request if the MAC address binding associated with the destination address information is not known.

* * * * *